(12) United States Patent
Mornet et al.

(10) Patent No.: US 6,402,672 B2
(45) Date of Patent: Jun. 11, 2002

(54) PRESSURE ROLLER FOR HARVESTING MACHINES

(75) Inventors: Nicolas Mornet, Sainte Marie aux Chênes; Benoit Louyot, Pagny les Goin, both of (FR); Martin Hawlas, Harsewinkel (DE)

(73) Assignee: Usines Claas France, Route de Thionville (FR)

( * ) Notice: Subject to any disclaimer, the term of this patent is extended or adjusted under 35 U.S.C. 154(b) by 0 days.

(21) Appl. No.: 09/507,801

(22) Filed: Feb. 22, 2000

(30) Foreign Application Priority Data

Feb. 22, 1999 (DE) .......................................... 199 07 290

(51) Int. Cl.$^7$ .............................................. A01D 57/00
(52) U.S. Cl. ...................................... 492/45; 56/16.4 B
(58) Field of Search .............................. 492/45, 16, 47; 100/89, 162 B, 88; 56/16.4 B, 341

(56) References Cited

U.S. PATENT DOCUMENTS

| 4,580,395 A | * | 4/1986 | Castoldi ................... 56/16.4 B |
| 4,716,637 A | * | 1/1988 | McIntosh et al. .............. 492/39 |
| 5,146,846 A | * | 9/1992 | Lee et al. ...................... 99/620 |
| 5,415,611 A | * | 5/1995 | Krayenhagen ............... 492/16 |
| 5,803,235 A | * | 9/1998 | McGinnis et al. .......... 198/843 |

OTHER PUBLICATIONS

Claas KGaA "Rundballenpresse (Round Balers) Rollant 66 46 46 Roto Cut" brochure, including English version, 8/98.

* cited by examiner

Primary Examiner—S. Thomas Hughes
(74) Attorney, Agent, or Firm—Husch & Eppenberger, LLC; Robert E. Muir

(57) ABSTRACT

A roller in the form of a hollow cylinder is for use in harvesting machines and has inner support plates provided within the roller. A plurality of the innermost support plates are connected together by at least one axle section so as to prevent lateral displacement.

7 Claims, 2 Drawing Sheets

PRESSURE ROLLER FOR HARVESTING MACHINES

BACKGROUND OF THE INVENTION

The present invention relates generally to agricultural machinery and more particularly to an improved pressure roller for use in a harvesting machine. Advantageously, the roller is in the form of a hollow cylinder having a plurality of mutually spaced support plates, wherein stub hubs serve as rotational axes for the roller and are fixed to the ends of the hollow cylinder.

Pressure rollers are used in round balers, although they are also referred to as compression rollers in forage harvesters or sugar cane harvesting machines, as well as corn cracker rollers in forage harvesters and other comparable applications. Balers are also used for compacting and wrapping refuse or recyclable materials. Hence, the terms "agricultural machinery" and "baler" should be taken as encompassing all uses for such equipment. However, as one example of use, the device will be explained hereinafter as it is used in a round-baler.

It is known from the product catalogue issued by the company CLAAS KGaA ."Round Balers Rollant 66 46 46 ROTO CUT" bearing the printing date August 1998 at page 16, to stabilize a pressure roller in the form of a hollow cylinder having a plurality of mutually spaced support plates within the hollow cylinder, with all of these support plates attached at their peripheries in non-rotatory manner to the roller casing by means of welded joints. Transfer of torque from the roller hubs to the roller casing and flexural stresses cause strain between the roller casing and the peripheral boundaries of the support plates, thereby destroying the welded connections and resulting in the support plates breaking off, rendering the rollers unusable. Compared to the previously satisfactory, conventionally reinforced rollers, damage of this nature occurs more often when the rollers are subjected to particularly high loads such as those produced by the increased baling pressures occurring in the newer, high performance round balers. High loads effective axially and as quasi point-like sources at one position of a roller, cause the roller to become deformed in that it tends to bend or to bow. If this roller is then loaded during operation and while rotating, the connections between the outer roller casing and the inner support plates are subjected to changing loads which may eventually lead to the occurrence of brittle fractures in these connections. Once the connection to the roller casing has been broken, the support plates may lay flat and start to move around. The rollers will then bulge and break. The consequences of such roller breakages are high repair costs and interruptions in the work pattern of the machine.

SUMMARY OF THE INVENTION

It is an object of the invention to overcome one or more of the deficiencies described above.

Another object is to develop the rollers of the type mentioned above in such a way as to make them sturdier while still retaining their light construction and ease of installation.

In accordance with the present invention, there is provided a roller for harvesting machines, wherein said roller is in the form of a hollow cylinder having an exterior wall and opposite ends, a plurality of mutually spaced inner support plates engaged with an inner surface of the wall, a stub shaft at each end of the cylinder and fixed to the respective end of the cylinder, the stub shafts serving as rotational axis for the roller, and means for preventing lateral displacement of the plurality of inner support plates and including at least one axle section at the rotational axis of the roller.

Preferably, a plurality of the innermost support plates are connected together by at least one axle section, thereby preventing lateral displacement thereof. The axle section relieves the lateral flexural forces exerted upon the individual support plates and distributes said forces over the adjacent support plates that are also connected to the axle section. The peak loads upon the individual support plates are reduced due to the distribution of the load achieved by this form of support. In addition, the micro-movements of the support plates caused by the changing loads are reduced, thereby decreasing the likelihood of brittle fractures.

It can also be advantageous for a plurality of the inner support plates to not be connected to the roller casing in a non-rotational manner. As a result, the micro-movements of the support plates relative to the roller casing, that occur even when the support plates are interconnected by an axle section, will not be prevented by a welded joint, but rather, such movements will be permitted. Since movement is now possible at the points of connection, which are otherwise usually welded, peak loads and brittle fractures at these points can now be avoided. On the other hand, due to their tight fit, the support plates can still absorb point-like loads from the roller casing via their peripheries, the axle section and the other support plates connected to the axle section, thereby distributing these loads over a large area of the roller casing. Even though the support plates are not connected to the roller casing in a non-rotational manner, they still cannot lie flat and move around because they are prevented from so doing by virtue of their rigid connection to the axle section. Since it is the innermost support plates in particular that are subjected to the highest bending moments, it is these which should not be connected to the roller casing in a non-rotational manner. Advantageously however, the outer support discs are connected to the roller casing so as to be able to convey the drive power from the stub hub to the roller casing while preventing axial displacement of the innermost support plates and axle sections.

The inner axle sections are prevented from axial displacement by virtue of the external stub hubs enclosing one or more of the axle sections connecting the support plates together in a co-axial and approximately non-spaced manner.

The outer stub hubs are connected to the roller casing via support plates in a non-rotational manner. The appertaining stub hubs form outwardly extending rotational axes to provide a connection for a drive and mounting means. In this manner, the stub hubs can be economically installed and centralized using only a small number of parts. Only a few assembly components are needed and the support for the stub hubs provided by the support plates permits the drive power to be fed to the roller casing just as the loads effective on the roller casing are passed to the mounting arrangement for the roller.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
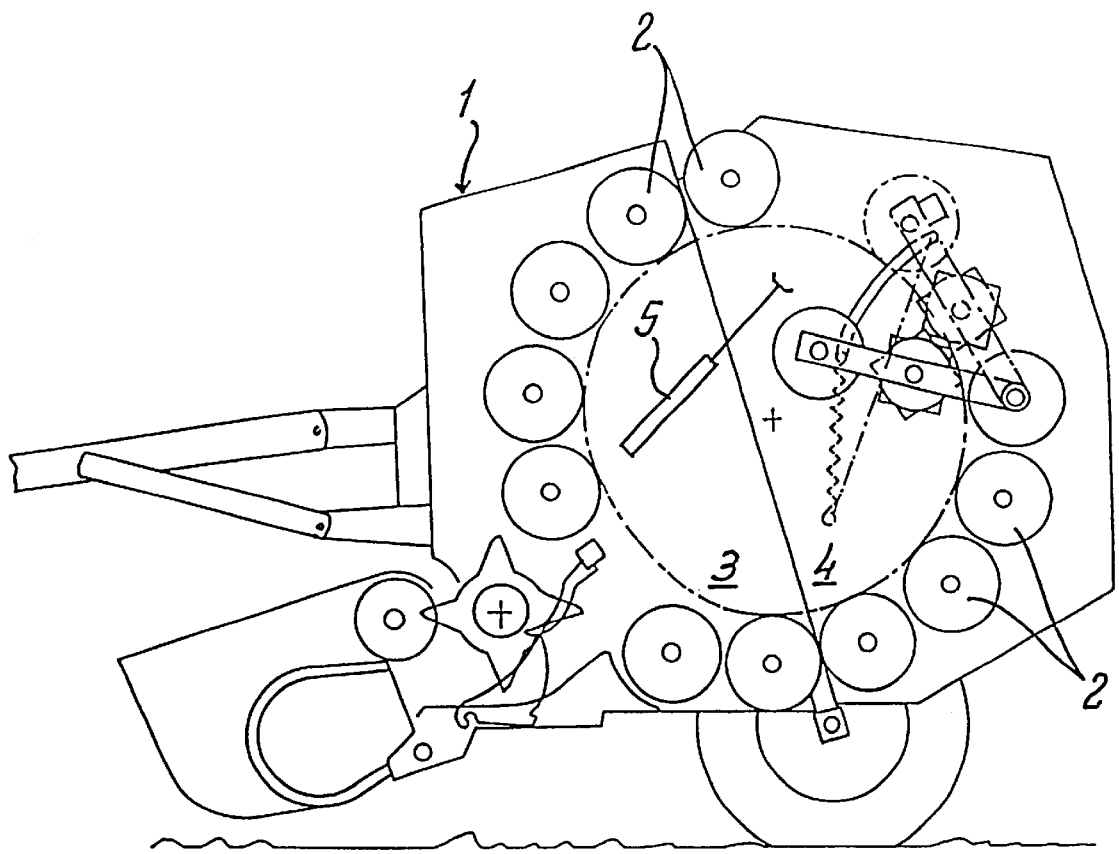
FIG. 1 is a schematic side depiction of a round baler.
Figure 2:
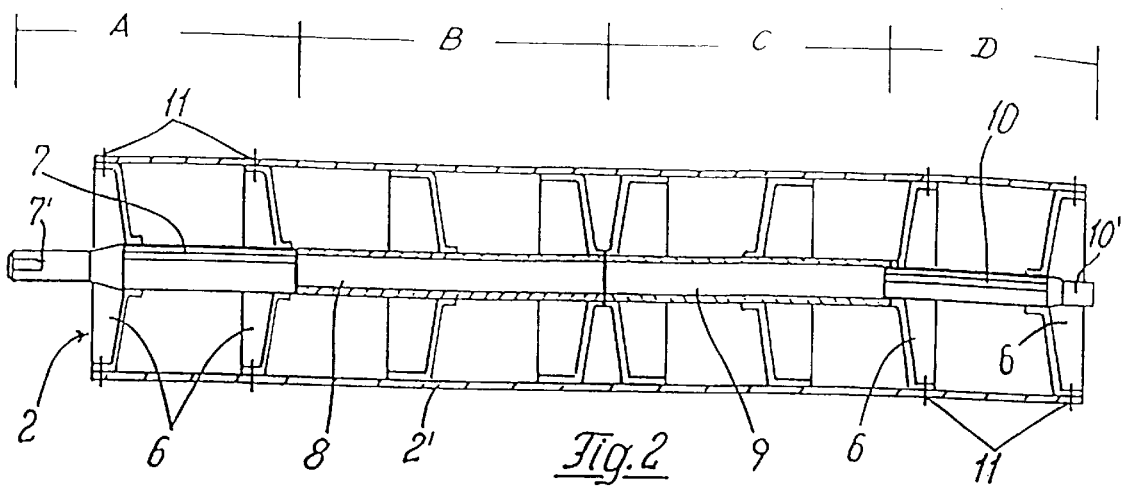
FIG. 2 is a schematic view, partly in longitudinal section through a roller constructed in accordance with one embodiment.

As shown in FIG. 1, a round baler 1 used for stalky agricultural crops has a bale chamber bound by driven pressure rollers 2 which are arranged generally in the form of a circle. A rear half portion 4 of two half-housings 3 and 4 can be pivoted out by a hydraulic cylinder 5 for the purposes of emptying the bale chamber. Each pressure roller 2 is in the form of a hollow metal cylinder, which has a wall casing 2' shown in FIGS. 2–4. The wall casing 2' of the hollow cylinder may be a tube or a curved metal sheet whose edges are connected together to form a tube. The wall casing 2' also may be constructed from several shell elements. A plurality of tightly fitting, mutually spaced, pressed-out support plates 6 are inserted into the interior of the roller 2. The support plates 6 are formed into groups A–D (FIG. 2) and are centralized and held in non-rotational manner on axle sections 7–10. In the FIG. 2 embodiment, axle sections 7 and 10 are conveniently stub shaft sections; while axle sections 8 and 9 are tubular sections. Only the support plates 6 in the groups A and D are connected at their peripheries in non-rotational manner to the roller casing 2' by means of weldments 11. Stresses in the region between the groups of support plates B and C and the roller casing 2' are thereby avoided, notwithstanding rotational and flexural loads. At their outer parts, the axle sections 7 and 10 have formed hubs 7' and 10' for drive and mounting connections. Also, the axle sections 7 and 10 enclose the axle sections 8 and 9 with virtually no spacing (i.e. like a force fit), although there is no rotational connection therewith, thus preventing these sections 8 and 9 and the appertaining groups of support plates B and C from being axially displaced.

Figure 3:
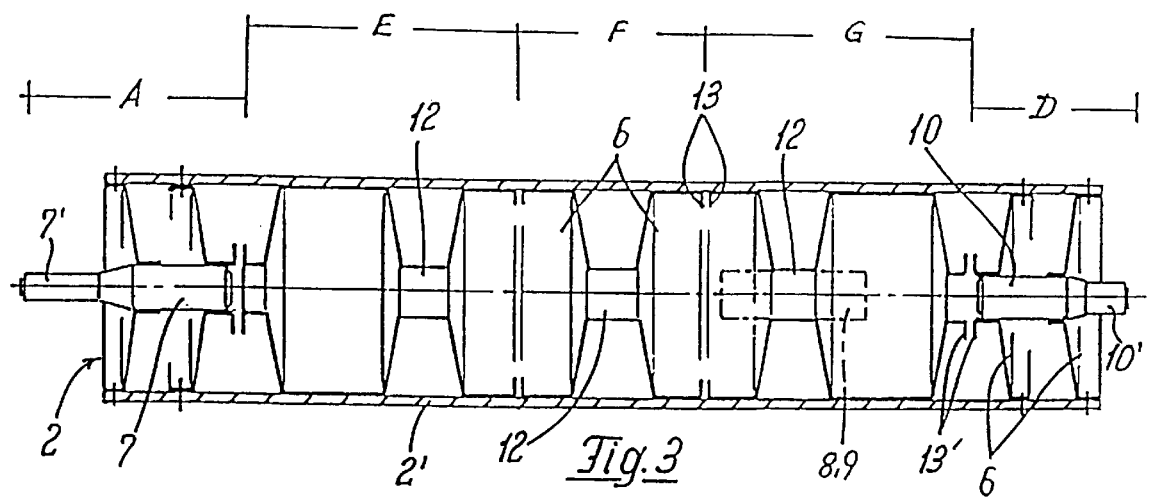
FIG. 3 is a schematic view, partly in longitudinal section through a roller constructed in accordance with another embodiment.
Figure 4:
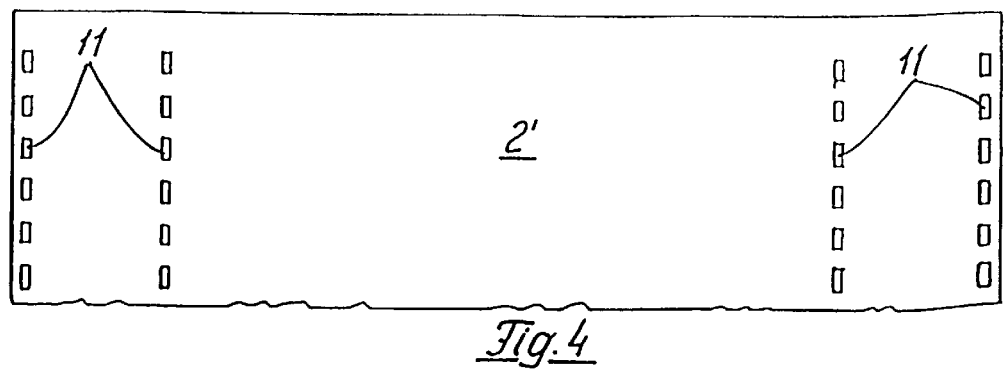
FIG. 4 is a partial view of a casing for the roller shown in FIG. 2.

Instead of using a centralizing axle section, the support plates 6 could also be connected directly together by means of one or more interconnecting support stub shafts 12 whereby they are again formed into groups. An embodiment reflecting this feature is illustrated in FIG. 3. Here, it can be observed that the groups of support plates A, D, E, F, G are prevented from axial displacement by means of their own end support plates. In other words, the support plates 6 are arranged with their outer diameter marginal surfaces 13 facing each other as shown in FIG. 3 (as opposed to facing away from each other as in FIG. 2). Conveniently, the support plates 6 in groups A and D of FIG. 3 have inner diameter marginal surfaces 13' abutting a similar inner diameter marginal surface on the adjacent support plate in group E and G. Thus, in this embodiment, the space between the sections A and D is filled by a total of three groups of support plates E–G which are either abutting or spaced via sub shafts 12.

Pressure rollers constructed in accordance with the invention may have a profiled outer surface, and they may be knobbed, structured or coated in any manner without this having any effect upon the underlying principle of the invention. In practice, these rollers are not limited to round balers having a baling chamber that is at least partially bounded by the rollers, but they may also be employed as guide rollers in so-called strip balers. Furthermore, they may take various other forms and be located at other positions in harvesting machines subjected to corresponding loads.

Other objects, features and advantages will be apparent to those skilled in the art. While preferred embodiments of the present invention have been illustrated and described, this has been by way of illustration and the invention should not be limited except as required by the scope of the appended claims.

We claim:

1. A roller for harvesting machines, wherein said roller is in the form of a hollow cylinder having an exterior wall and opposite ends;
   an outer stub shaft section at each end of the cylinder, the outer stub shaft sections defining a rotational axis for the roller;
   a plurality of mutually spaced inner support plates engaged with an inner surface of the exterior wall, the inner support plates including at least one inner support plate at each end of the cylinder which is fixed to the exterior wall of the cylinder and to the respective stub shaft section, wherein a plurality of the inner support plates other than the ones at each end of the cylinder are not fixedly connected to the inner surface of the exterior wall; and
   means for preventing lateral displacement of said plurality of inner support plates which are not fixedly connected, said means including at least one inner axle at the rotational axis of the roller and adjacent the outer stub shaft sections without being fixed thereto.

2. The roller according to claim 1, wherein the stub shaft sections have inner ends which engage the at least one inner axle without rotational connection thereby connecting the plurality of support plates together in a co-axial manner.

3. The roller according to claim 1, wherein the outer stub shaft sections provide a connection for the drive and mounting means.

4. A roller for harvesting machines, including a hollow cylinder having lateral ends, a plurality of mutually spaced inner support plates inside the cylinder, a stub shaft section at each end of the cylinder and serving as a rotational axis for the roller, the stub shaft sections being fixed to the hollow cylinder at the respective end thereof, and the inner support plates being arranged in groups in the interior of the roller in the following manner:
   a) two groups of the inner support plates, one at each lateral end of the roller, being fixedly connected to the cylinder;
   b) a third group of the inner support plates located between the two groups of inner support plates at the ends of the roller, said third group being fitted within the cylinder but without being fixed thereto;
   c) the third group of the inner support plates located between the two groups of the inner support plates at the ends of the roller being disposed coaxially within the cylinder; and
   d) means for preventing axial displacement of the third group of the inner support plates, whereby each support plate of the third group of the inner support plates is axially positioned within the cylinder without being fixed thereto.

5. The roller according to claim 4, wherein a plurality of the inner support plates are connected together by at least one support stub shaft section.

6. The roller according to claim 5, wherein a plurality of support plates are connected together by at least one axle section.

7. The roller according to claim 4, wherein the groups of inner support plates are supported by the two opposite end support plates of the groups of inner support plates.

* * * * *